US012466045B1

(12) United States Patent
Pai

(10) Patent No.: US 12,466,045 B1
(45) Date of Patent: Nov. 11, 2025

(54) DUAL-MODE STAPLER

(71) Applicant: SDI CORPORATION, Chang Hua (TW)

(72) Inventor: Cheng-Yu Pai, Chang Hua (TW)

(73) Assignee: SDI CORPORATION, Chang Hua (TW)

(*) Notice: Subject to any disclaimer, the term of this patent is extended or adjusted under 35 U.S.C. 154(b) by 0 days.

(21) Appl. No.: 19/011,002

(22) Filed: Jan. 6, 2025

(51) Int. Cl.
*B25C 5/00* (2006.01)
*B25C 5/02* (2006.01)

(52) U.S. Cl.
CPC .................................... *B25C 5/025* (2013.01)

(58) Field of Classification Search
CPC ..... B25C 5/025; B25C 5/0242; B25C 5/1658; B25C 5/1679; B25C 5/1682
USPC ............. 227/156, 109, 119, 137, 120, 176.1, 227/180.1, 19, 127, 134
See application file for complete search history.

(56) References Cited

U.S. PATENT DOCUMENTS 5,979,734 A * 11/1999 Chang .................. B25C 5/0214 227/76
2011/0062210 A1* 3/2011 Leung .................. B25C 5/0242 227/155

* cited by examiner

*Primary Examiner* — Jacob A Smith
(74) *Attorney, Agent, or Firm* — RABIN & BERDO, P.C.

(57) ABSTRACT

A dual-mode stapler has a first base, a second base, a magazine assembly, a hammer assembly, and a fastening mechanism. The second base, the magazine assembly, and the hammer assembly are pivotally connected with the first base. The fastening mechanism has an operating unit and an elastic unit disposed on one of the first and the second bases. The operating unit is configured to slide between a locking position and an unlocking position. When the operating unit is at the locking position, the operating unit is engaged with the other one of the first and the second bases to maintain the stapler in a staple-folding mode. When the operating unit is at the unlocking position, the second base pivots away from the magazine assembly to an open state to switch the stapler to a tacking mode.

20 Claims, 12 Drawing Sheets

DUAL-MODE STAPLER

BACKGROUND OF THE INVENTION

1. Field of the Invention

The present invention relates to a hand tool for stapling, and particularly to a dual-mode stapler.

2. Description of Related Art

A stapler is a hand tool for driving staples through sheets to join the sheets. A conventional stapler has a base, a staple magazine, and a hammer, wherein the staple magazine and the hammer are pivotally connected to the base. By pressing the hammer to drive the staple magazine to pivot toward the base, a staple is driven and mounted through to-be-stapled objects, and a crimper on the base folds up tips of the staple to finish stapling.

For ease of operation, there are various staplers that lower a force for pressing the hammer via different linkages in the hammer. E.g., in a conventional stapler, the hammer has multiple bars, wherein a part of the multiple bars and the staple magazine are pivotally connected to a position on the base, and the other part of the multiple bars are pivotally connected to another position on the base. Thereby, the multiple bars form different-length moment arms to transmit the pressing force to save labor force.

However, since the multiple bars are pivotally connected to different positions on the base, the conventional stapler mentioned above cannot be switched to a tacking mode. Specifically, when unfolding the base from the hammer and the staple magazine to drive a staple through to-be-stapled objects and into another object by the hammer without being folded (i.e., the tacking mode), the hammer and the staple magazine are unfolded as well, and the stapler fails to be switched to the tacking mode. Hence, the conventional stapler is of limited use.

To overcome the shortcomings of the conventional stapler, the present invention tends to provide a dual-mode stapler to mitigate or obviate the aforementioned problems.

SUMMARY OF THE INVENTION

The main objective of the present invention is to provide a dual-mode stapler which has a design of separated bases and is switchable between a tacking mode and a staple-folding mode in use.

The dual-mode stapler has two bases, a magazine assembly, a hammer assembly, and a fastening mechanism. The two bases are respectively a first base and a second base pivotally connected to the first base. The magazine assembly is pivotally connected with the first base and spaced from the second base. The hammer assembly is pivotally connected with the first base and spaced from the second base. The fastening mechanism has an operating unit and an elastic unit. The operating unit is disposed on one of the two bases and configured to slide between a locking position and an unlocking position along a sliding direction. The elastic unit is disposed between the operating unit and the base on which the operating unit is disposed, and the elastic unit is elastically deformable to drive the operating unit toward the locking position. When the operating unit is at the locking position, the operating unit is engaged with the other one of the two bases. When the operating unit is at the unlocking position, the operating unit is withdrawn from said the other one of the two bases so as to allow the second base to pivot relative to the first base away from the magazine assembly to an open state.

The present invention can be applied on any stapler having components pivotally connected to different positions on the base. By the first base for different components to be pivotally connected thereto, the second base configured to pivot to the open state and be unfolded for switching to the tacking mode, and the fastening mechanism for locking and unlocking the first and second bases, the present invention is freely switchable between the staple-folding mode and the tacking mode. Thus, the present invention provides the dual-mode stapler being more versatile and unlimited in use.

DETAILED DESCRIPTION OF THE PREFERRED EMBODIMENT

Figure 1:
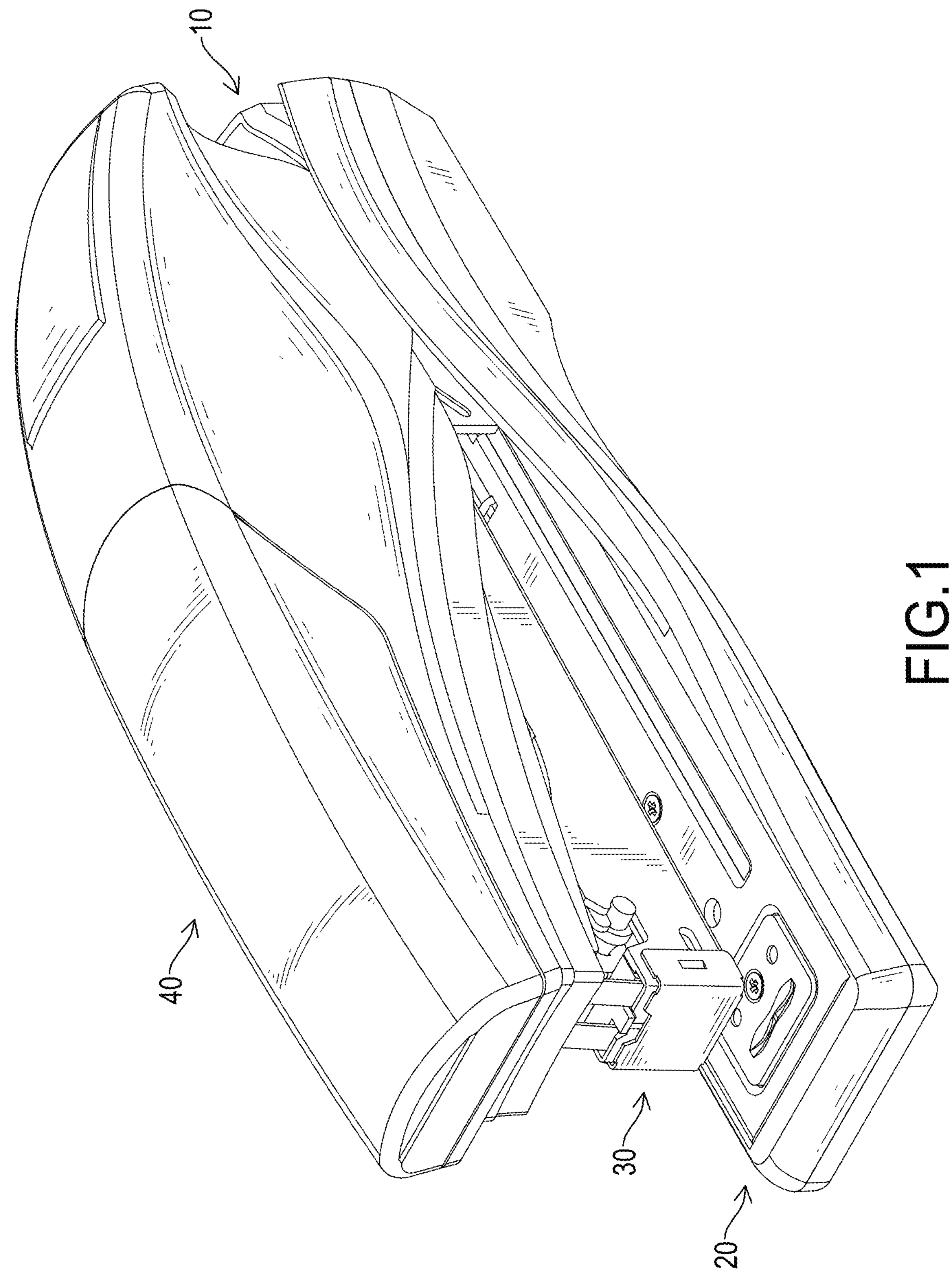
FIG. 1 is a perspective view of a first preferred embodiment of a dual-mode stapler in accordance with the present invention.
Figure 2A:
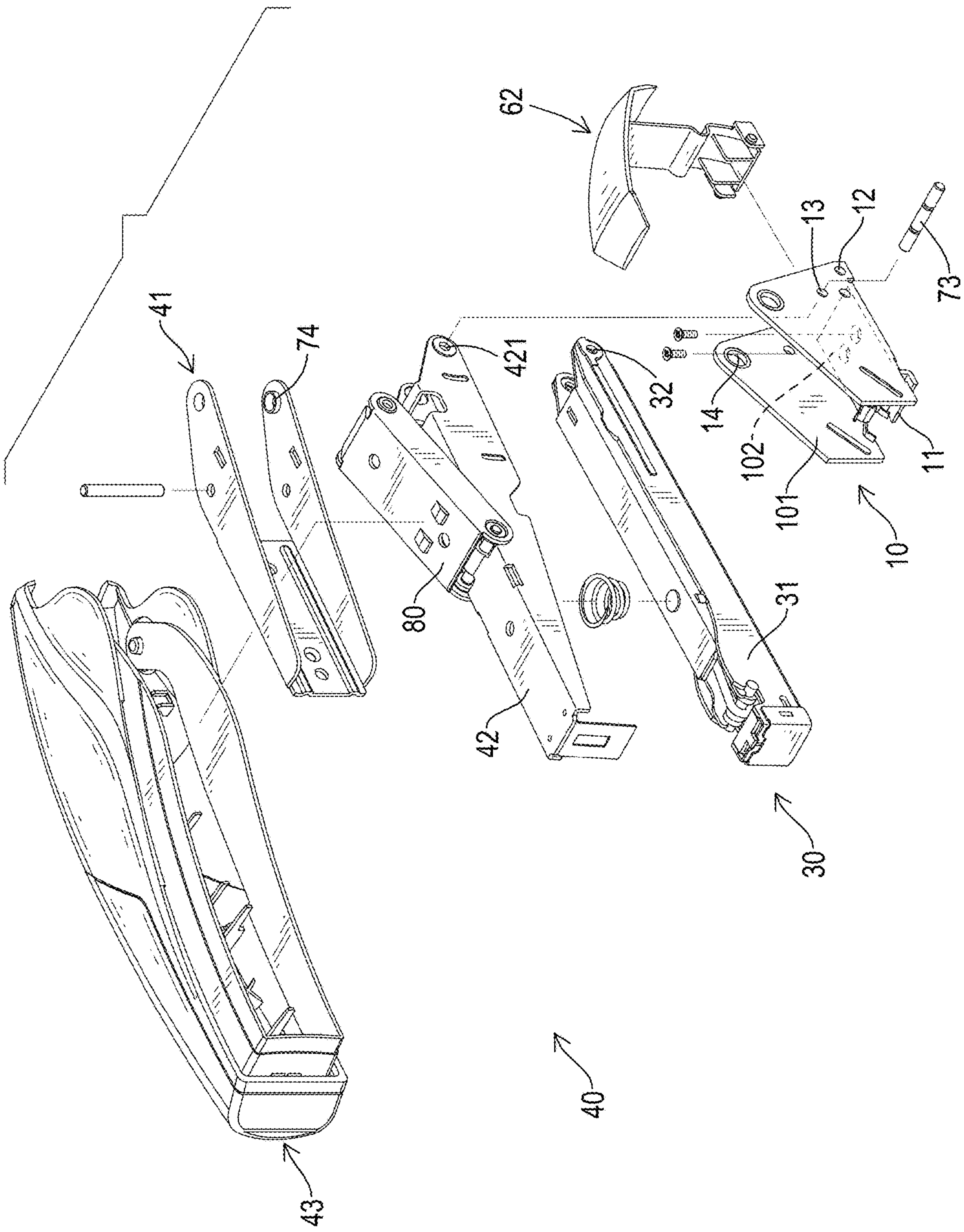
FIGS. 2A and 2B are exploded views of the stapler in FIG. 1.
Figure 2B:
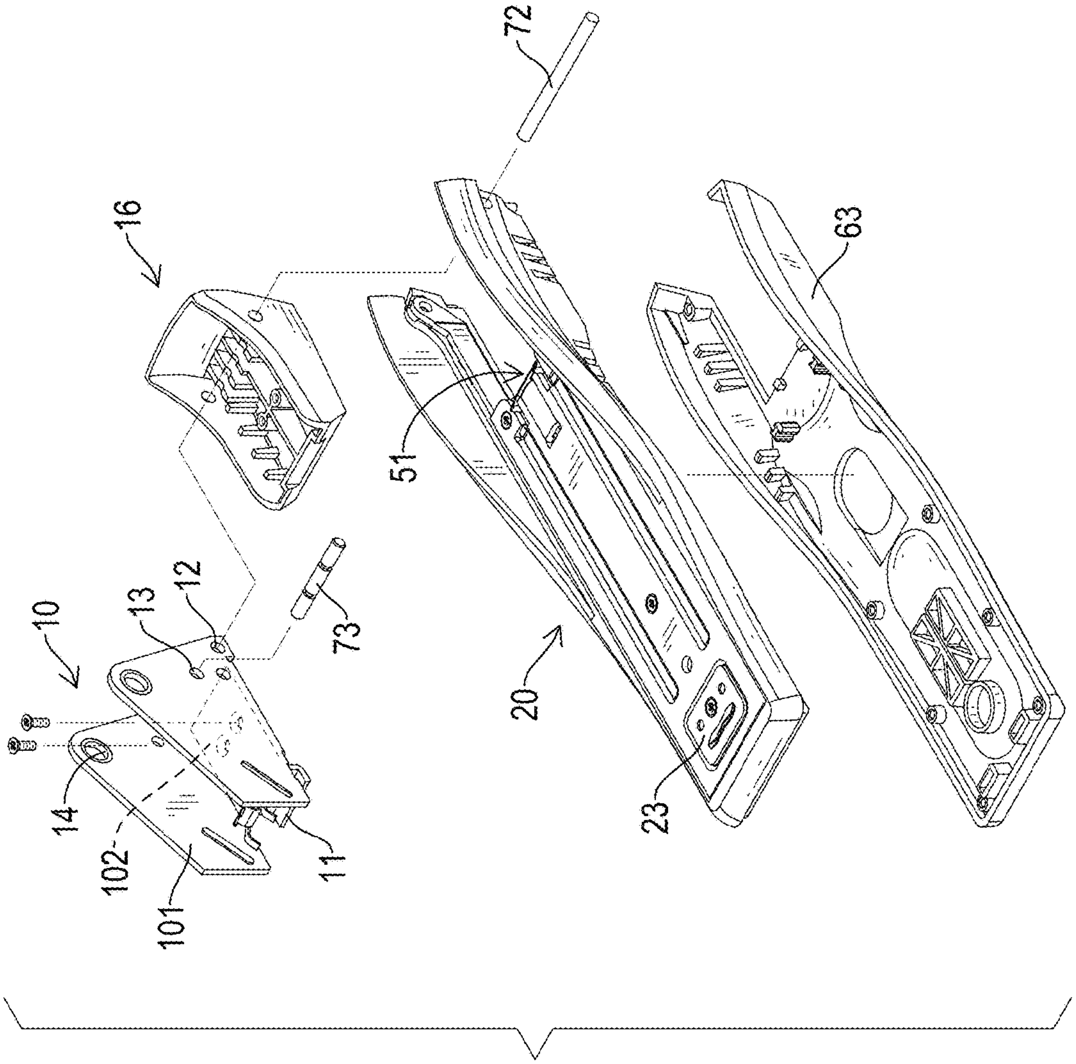
Figure 3:
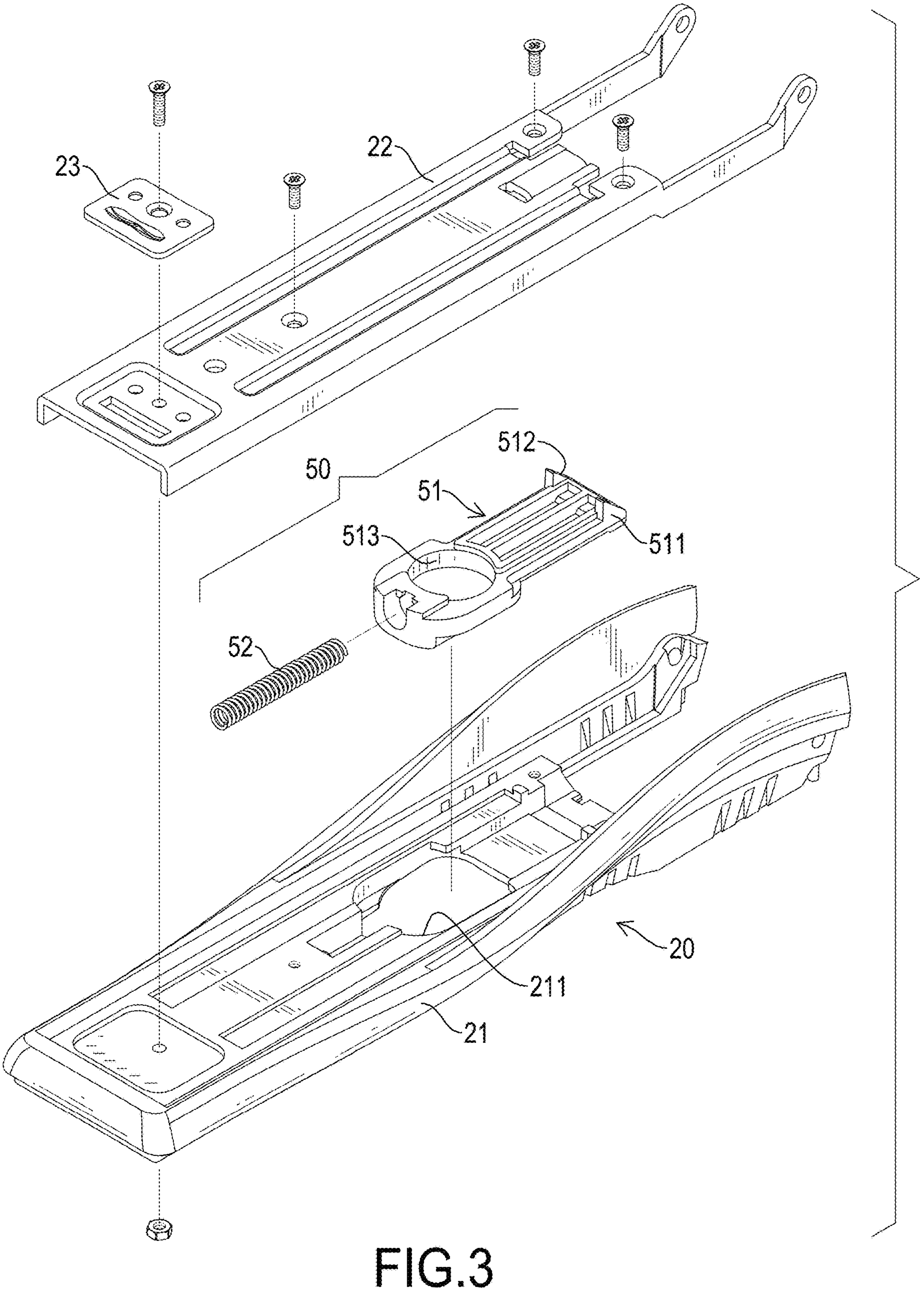
FIG. 3 is an exploded view of a second base and a fastening mechanism of the stapler in FIG. 1.

With reference to FIGS. 1 to 3, a first preferred embodiment of a dual-mode stapler in accordance with the present invention has two bases, a magazine assembly 30, a hammer assembly 40, and a fastening mechanism 50. The two bases are respectively a first base 10 and a second base 20. The second base 20 is pivotally connected with the first base 10. The magazine assembly 30 and the hammer assembly 40 are pivotally connected to the first base 10. The fastening mechanism 50 is disposed on one of the two bases.

With reference to FIGS. 2A and 2B, the first base 10 has multiple pivot positions arranged at spaced intervals. In the first preferred embodiment, the multiple pivot positions include a first pivot position 12, a second pivot position 13, and a third pivot position 14 respectively for the second base 20, the magazine assembly 30, and the hammer assembly 40 to be pivotally connected thereto. The first base 10 has two mount boards 101 being parallel to each other and a connecting board 102 connected between the two mount boards

101. The first pivot position 12, the second pivot position 13, and the third pivot position 14 are formed on the two mount boards 101.

With reference to FIGS. 2A and 2B, specifically, each one of the multiple pivot positions has two pivot holes respectively formed through the two mount boards 101. For pivotal connections between the first base 10 and the components, each one of two pivot shafts 72, 73 is mounted through the two pivot holes of a respective one of the multiple pivot positions and a respective one of the components, or two pivot cylinders 74 are formed on a respective one of the components and respectively inserted into the two pivot holes. In other embodiments, said pivot cylinders and said pivot holes may be respectively formed on the first base 10 and the second base 20, the magazine assembly 30, and the hammer assembly 40. Configurations of pivotal connections are not limited to the first preferred embodiment.

With reference to FIG. 2B, the second base 20 is elongated and has two ends being opposite to each other. One of the two ends of the second base 20 is pivotally connected to the first pivot position 12. Specifically, the second base 20 has two extending arms formed on one of the two ends, and the two mounted boards 101 are located between the two extending arms of the second base 20. The first base 10 has a first rear cover 16 covering a portion of the connecting board 102 and the two mount boards 101. Said pivot shaft 72 is mounted through the two extending arms of the second base 20, the first rear cover 16, and the two mount boards 101.

With reference to FIG. 2B, the second base 20 has a crimper to fold a staple. In the first preferred embodiment, the second base 20 has an anvil 23 disposed on one of the two ends of the second base 20 away from the first base 10. The anvil 23 has a groove in a specific shape to bend legs of a staple.

With reference to FIG. 2A, the magazine assembly 30 and the hammer assembly 40 are both elongated and each have a respective end pivotally connected to the first base 10. The magazine assembly 30 has a staple magazine 31 for containing staples. The hammer assembly 40 has a hammer 42 being pressable to pivot relative to the first base 10, thereby hammering a staple out of the staple magazine 31 to the groove on the anvil 23.

Moreover, with reference to FIG. 2A, in the first preferred embodiment, the hammer assembly 40 has an auxiliary hammer 41, a labor-saving link 80, and an upper cover 43. The auxiliary hammer 41 is pivotally connected to the third pivot position 14 via said pivot cylinders 74. Said pivot shaft 73 is mounted through two aligned hammer holes 421 on the hammer 42, two magazine holes 32 on the magazine assembly 30, and the two pivot holes of the second pivot position 13 to connect the hammer 42 and the magazine assembly 30 to the second pivot position 13. Two ends of the labor-saving link 80 are pivotally and respectively connected to the hammer 42 and the magazine assembly 30. Thereby, the hammer assembly 40 forms multiple moment arms of different lengths to transmit force so as to save labor. The upper cover 43 is made of plastic material and covers the auxiliary hammer 41 for the convenience of operation.

To simplify, the hammer assembly 40 has the hammer 42 and the auxiliary hammer 41 connected with each other via the labor-saving link 80. The hammer 42 and the magazine assembly 30 are pivotally connected to the second pivot position 13, and the auxiliary hammer 41 is pivotally connected to the third pivot position 14.

With reference to FIG. 3, the fastening mechanism 50 has an operating unit 51 and an elastic unit 52. In the first preferred embodiment, the operating unit 51 is slidably disposed in the second base 20. Specifically, the second base 20 has a base body 21 and an upper cover 22 covering on the base body 21. The base body 21 and the upper cover 22 form a space therebetween for the operating unit 51 to be slidably disposed. The operating unit 51 is configured to slide between a locking position and an unlocking position along a sliding direction S. More specifically, the base body 21 is a plastic component, and the upper cover 22 is a metal component.

Figure 4:
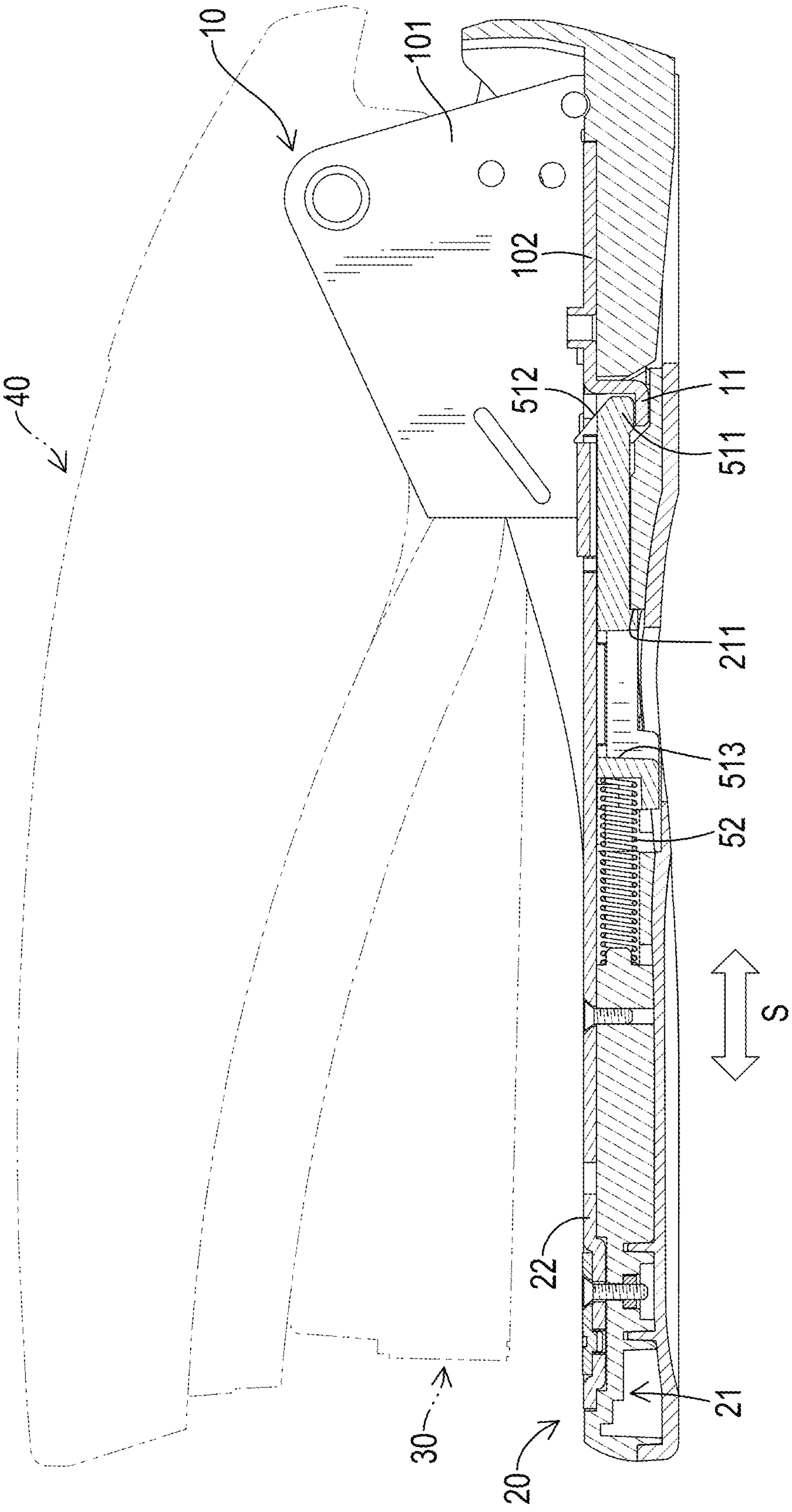
FIG. 4 is a sectional side view of an operating unit of the fastening mechanism in FIG. 3 at a locking position.

With reference to FIGS. 3 and 4, in the first preferred embodiment, the operating unit 51 has an engaging portion 511 located on an end of the operating unit 51 near the first base 10. The first base 10 has an engaging hook 11 extending curvedly from an end of the connecting board 102 near the operating unit 51. With reference to FIG. 4, when the operating unit 51 is at the locking position, the engaging portion 511 is located between the engaging hook 11 and the magazine assembly 30 and is engaged with the engaging hook 11.

With reference to FIGS. 3 and 4, the elastic unit 52 is disposed between the operating unit 51 and the second base 20. In the first preferred embodiment, the elastic unit 52 is a compression spring disposed along the sliding direction S between the base body 21 and the upper cover 22, and the operating unit 51 is located between the elastic unit 52 and the first base 10. Two opposite ends of the elastic unit 52 respectively abut against the operating unit 51 and the base body 21, such that the elastic unit 52 stably pushes the operating unit 51 toward the locking position via a restoring force.

The dual-mode stapler of the present invention is configured to be switched between a staple-folding mode and a tacking mode. With reference to FIG. 4, in the staple-folding mode, the operating unit 51 is driven to the locking position by the elastic unit 52. At the time, the operating unit 51 is engaged with the first base 10 to prevent the second base 20 from pivoting away from the magazine assembly 30 relative to the first base 10 and fix the two bases with respect to each other. The second base 20 is kept at a closed state, which ensures an appropriate distance to be maintained between the second base 20 and the magazine assembly 30. Thereby, to-be-stapled objects can be placed between the magazine assembly 30 and the anvil 23 of the second base 20. Afterwards, by pressing the hammer assembly 40, a staple in the magazine assembly 30 is then mounted through the to-be-stapled objects and folded by the recess of the anvil 23 to finish stapling.

Figure 5:
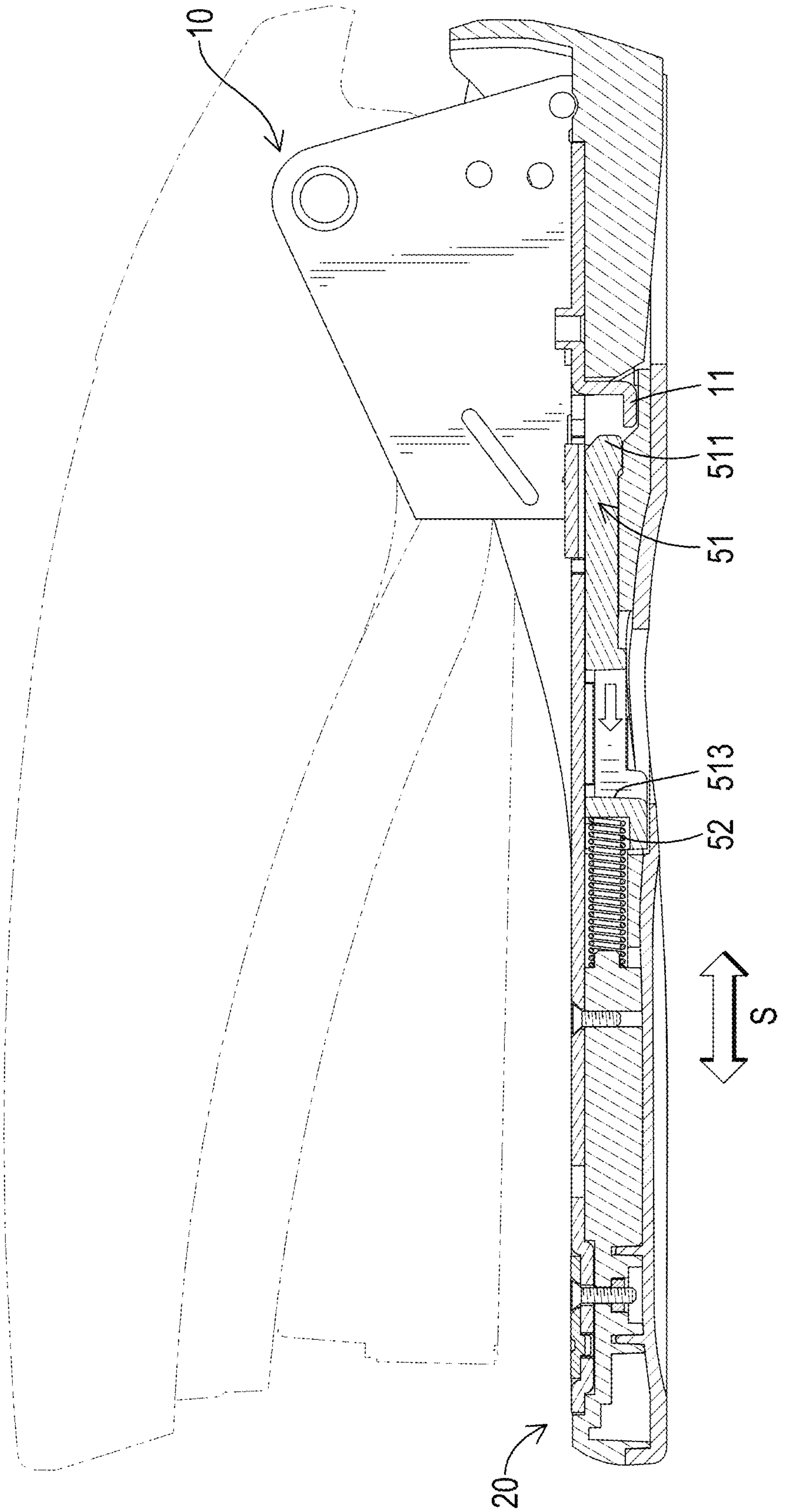
FIG. 5 is an operational view of the operating unit in FIG. 4 sliding to an unlocking position.
Figure 6:
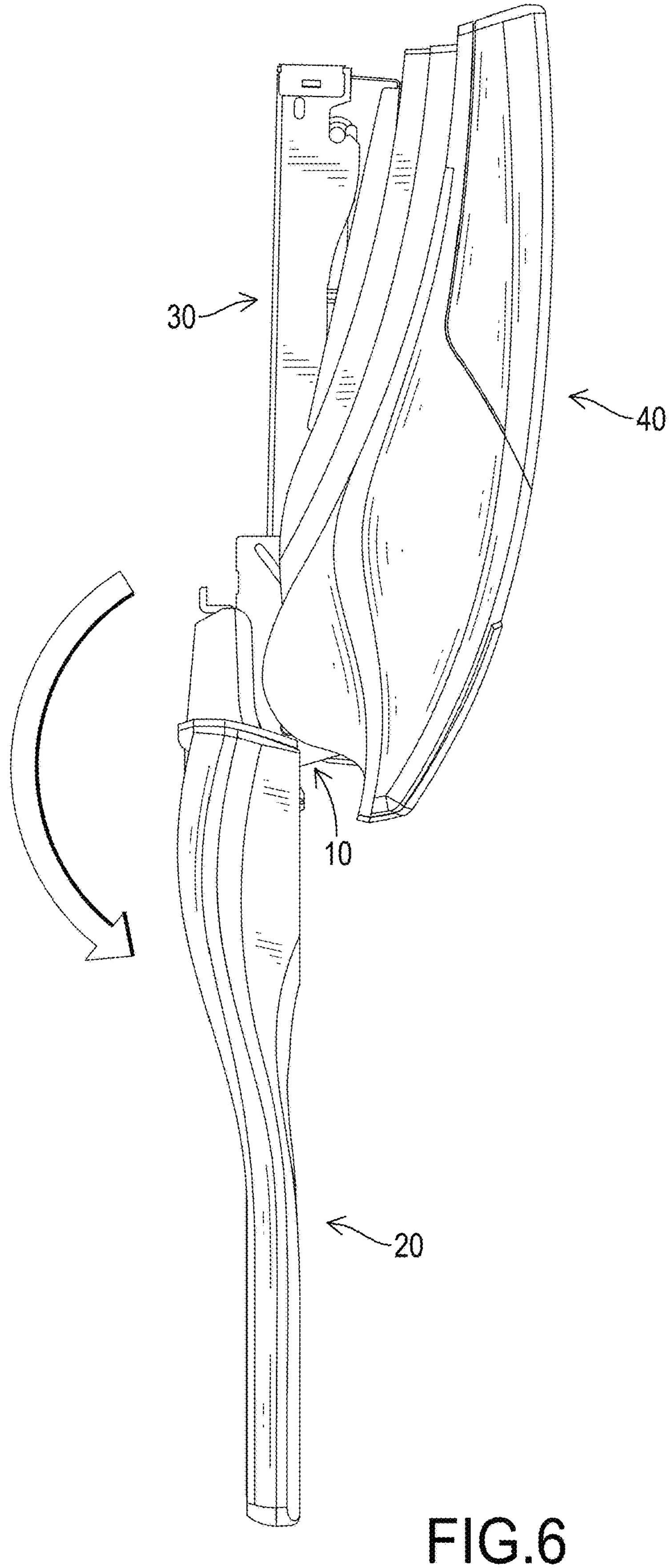
FIG. 6 is a side view of the second base of the stapler in FIG. 1 pivoting to an open state.

With reference to FIG. 5, by operating the operating unit 51 to slide from the locking position to the unlocking position, the operating unit 51 is withdrawn from the first base 10, and the engaging portion 511 of the operating unit 51 is no longer engaged with the engaging hook 11 of the first base 10. At the time, the second base 20 is unlimited and allowed to pivot away from the magazine assembly 30 relative to the first base 10 to an open state as shown in FIG. 6, such that the stapler is switched to the tacking mode. By placing to-be-stapled objects between the magazine assembly 30 and a target object and pressing the hammer assembly 40, a staple is mounted through the to-be-stapled objects and inserted into the target object. Thereby, the to-be-stapled objects can be fastened onto the object.

In the conventional stapler, the staple magazine and a part of components of the hammer are pivotally connected to different positions on the base, so the staple magazine and the hammer are unfolded as well when unfolding the base from the staple magazine and the hammer, and thereby, the conventional stapler cannot be switched to the tacking mode. In comparison, the present invention divides the base into the first base 10 and the second base 20. The first base 10 is configured for the magazine assembly 30, the hammer 42, and the auxiliary hammer 41 of the hammer 40 to be connected therewith, and the present invention has the fastening mechanism 50 for locking and unlocking the two bases. When the stapler is switched to the tacking mode, by pivoting and unfolding the second base 20 away from the magazine assembly 30 relative to the first base 10, the hammer 42 and the auxiliary hammer 41 connected with the first base 10 is prevented from being unfolded as well. In the staple-folding mode, the engagement of the operating unit 51 of the fastening mechanism 50 limits the second base 20 to maintain an appropriate distance between the second base 20 and the magazine assembly 30. Thereby, the present invention can be normally switched between the staple-folding mode and the tacking mode in use.

In addition, the present invention may also be applied when the hammer 42 and the auxiliary hammer 41 are connected with a same pivot shaft. With reference to FIG. 2A, the stapler further has a second rear cover 62 pivotally connected to the first base 10 for covering pivot configuration between the first base 10, the magazine assembly 30, and the hammer assembly 40. The second rear cover 62 is pivotally connected to a different position on the first base 10 spaced from the second position 13 and the third position 14. Since the conventional stapler has only one single base, the second rear cover 62 is actuated to move relative to and interfere with the staple magazine, the hammer, or other components when the base is being unfolded from the staple magazine even if the staple magazine and the components of the hammer are all connected with a same pivot shaft. The base is thus obstructed and cannot be unfolded to switch the conventional stapler to the tacking mode.

In comparison, the present invention has the configuration of the first base 10, the second base 20, and the fastening mechanism 50. The second rear cover 62 is pivotally connected to the first base 10, and when switching to the tacking mode, the second base 20 pivots away from the magazine assembly 30 to be unfolded. Thereby, the second rear cover 62 is prevented from interfering with the magazine assembly 30, the hammer assembly 40, or other components when switching the stapler to the tacking mode.

Accordingly, the present invention can be applied to any stapler having different components pivotally and respectively connected to different positions on the base. By the first base 10 for different components to be pivotally connected thereto, the second base 20 for pivoting to the open state to be unfolded, and the fastening mechanism 50 for locking and unlocking the two bases, the stapler of the present invention is freely switchable between the staple-folding mode and the tacking mode, preventing problems of the conventional stapler being unable to be switched to the tacking mode. Thereby, the present invention provides the dual-mode stapler being versatile and more unlimited in use.

Further, with reference to FIG. 3, the operating unit 51 has an inclined surface 512 formed on the engaging portion 511 and located in a direction of the second base 20 facing toward the magazine assembly 30. Specifically, in the perspective of FIG. 4, the two ends of the second base 20 are respectively a front end and a rear end and respectively near a left side and a right side of FIG. 4. The rear end of the second base 20 is pivotally connected with the first base 10. The inclined surface 512 faces the rear end of the second base 20 and tilts toward the front end of the second base 20 in a direction of a bottom side of FIG. 4 toward a top side of FIG. 4.

Figure 7:
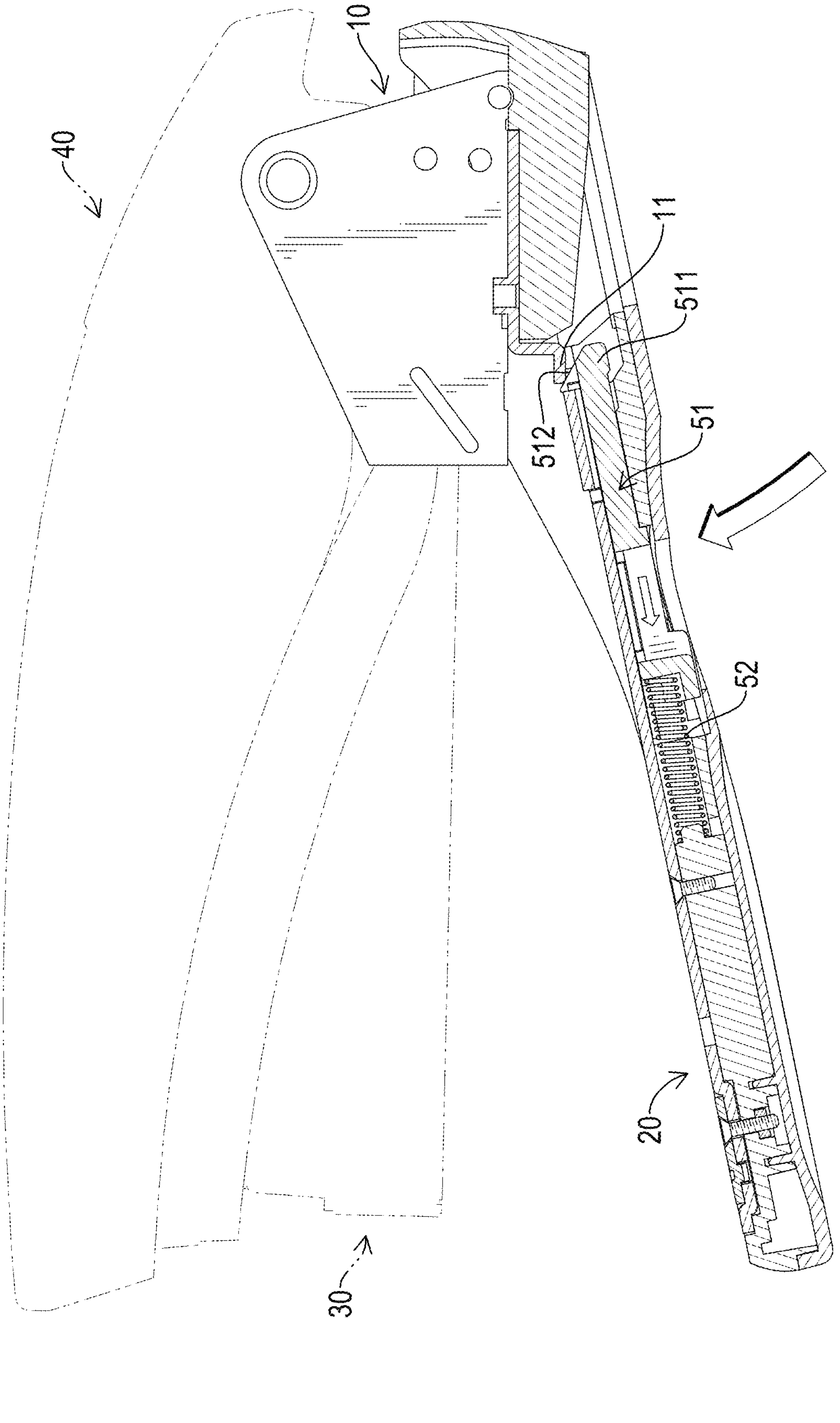
FIG. 7 is an operational view of the second base pivoting from the open state toward a magazine assembly of the stapler in FIG. 1.
Figure 8:
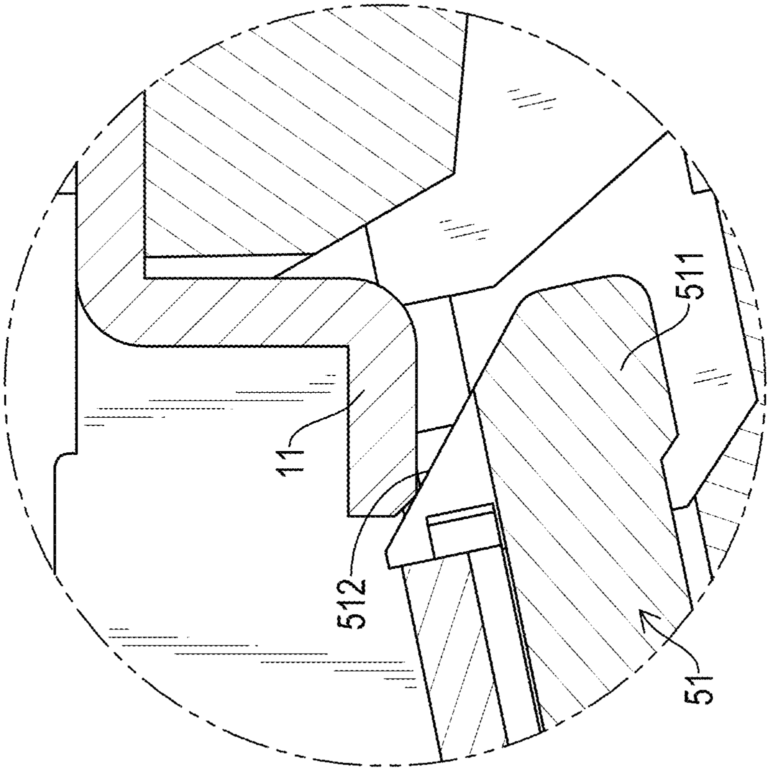
FIG. 8 is an enlarged view of FIG. 7.

With reference to FIGS. 7 and 8, to switch the stapler from the tacking mode to the staple-folding mode, the second base 20 pivots from the open state toward the magazine assembly 30. At the time, the engaging hook 11 abuts against the inclined surface 512 to push the operating unit 51 toward the unlocking position and actuate the elastic unit 52 to deform elastically. Until the engaging portion 511 passes the engaging hook 11, is re-engaged with the engaging hook 11, and is located between the engaging hook 11 and the magazine assembly 30, the stapler is switched back to the staple-folding mode.

By the inclined surface 512, when switching the stapler back to the staple-folding mode, a user needs not pull the operating unit 51. When the second base 20 pivots from the open state toward the magazine assembly 30, the operating unit 51 at the locking position is directly pushed away by the second base 20, such that the second base 20 can pivot back to the close state, which improves convenience in operation. In other embodiments, quantity or shape of said inclined surface 512 may be different according to a shape of the engaging portion 511, which is not limited to the first preferred embodiment.

Also, in other embodiments, configuration of pushing the inclined surface 512 and engaging with the operating unit 51 is not limited to the engaging hook 11. As long as the first base 10 is engaged with the engaging portion 511 of the operating unit 51 in the staple-folding mode and configured to abut the inclined surface 512 and push the operating unit 51 toward the unlocking position when switching the stapler from the tacking mode to the staple-folding mode, the above-mentioned efficacies of versatileness and improvement on convenience in operation can be achieved.

Further, with reference to FIGS. 3 and 4, the base body 21 of the second base 20 has a communicating hole 211. The communicating hole 211 is defined through the base body 21 along a direction being non-parallel to the sliding direction S and communicates with the space between the base body 21 and the upper cover 22. Specifically, the communicating hole 211 is defined along a direction being perpendicular to the sliding direction S. By the communicating hole 211, a user may insert a finger into the space between the base body 21 and the upper cover 22 through the communicating hole 211 to push or pull the operating unit 51 to slide. The operating unit 51 is still convenient to be operated when being disposed in the second base 20.

Besides, in the first preferred embodiment, the stapler has a bottom cover 63 connected to a bottom of the second base 20 and covering two ends of the pivot shaft 72 of the first base 10 and the second base 20. The bottom cover 63 has a through hole defined therethrough, aligned and communicating with the communicating hole 211, such that the communicating hole 211 can still perform the function described above.

Furthermore, with reference to FIGS. 3 to 5, the operating unit 51 has an operating hole 513. The operating hole 513 is formed on the operating unit 51 along a direction being non-parallel to the sliding direction S and is located within the scope of the communicating hole 211. Specifically, the operating hole 513 is formed along a direction being perpendicular to the sliding direction S. A user may insert a finger into the operating hole 513 through the communicating hole 211 to apply a force on the operating unit 51 along the sliding direction S and push the operating unit 51 to slide along the sliding direction S. Operation of the operating unit 51 is more convenient and labor-saving. In other embodiments, the operating hole 513 may be replaced by a recess, a notch, or other structure for a user's finger to reach into.

Figure 9:
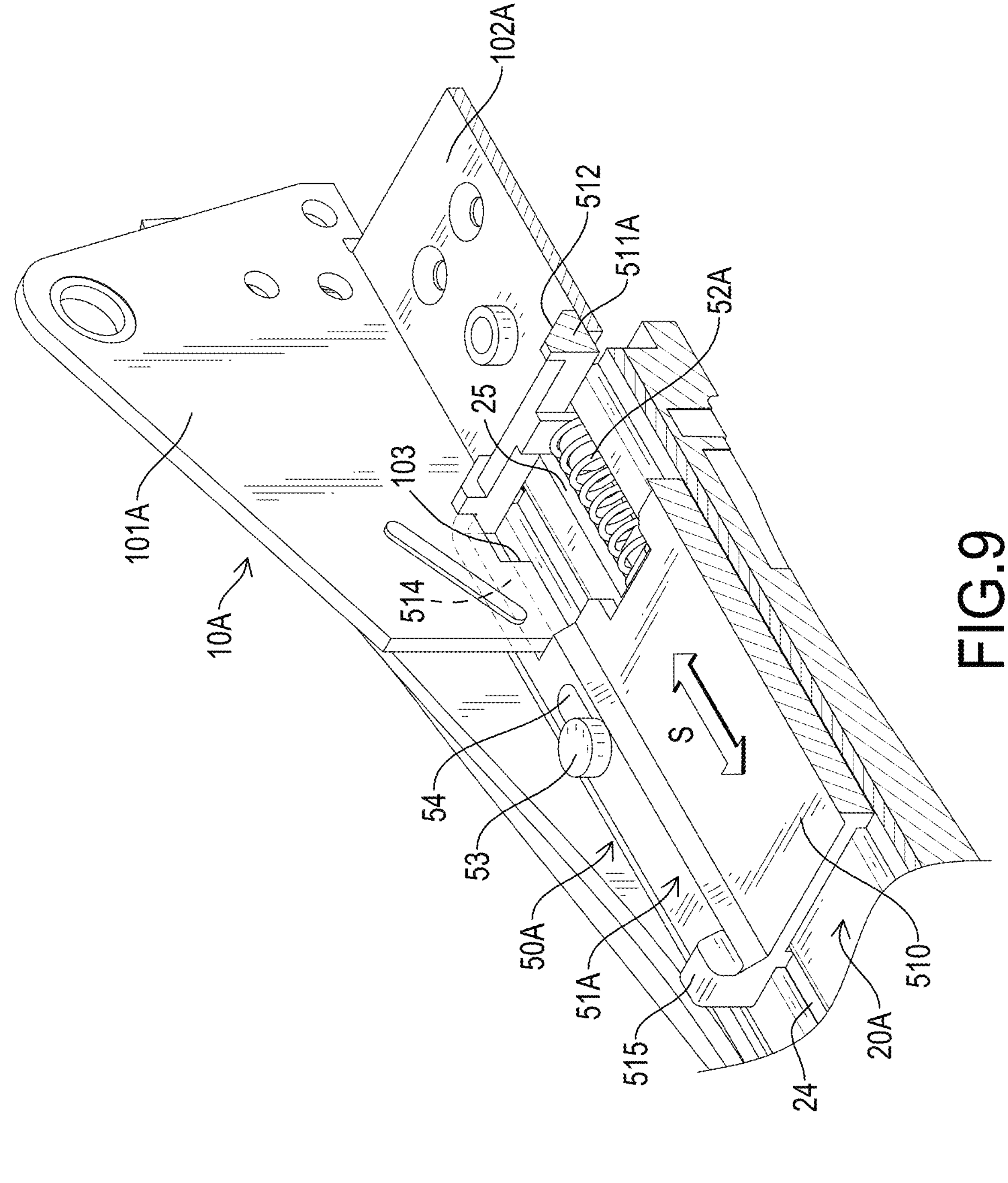
FIG. 9 is a cross-sectional perspective view of a first base, the second base, and the fastening mechanism of a second preferred embodiment of the dual-mode stapler in accordance with the present invention.
Figure 10:
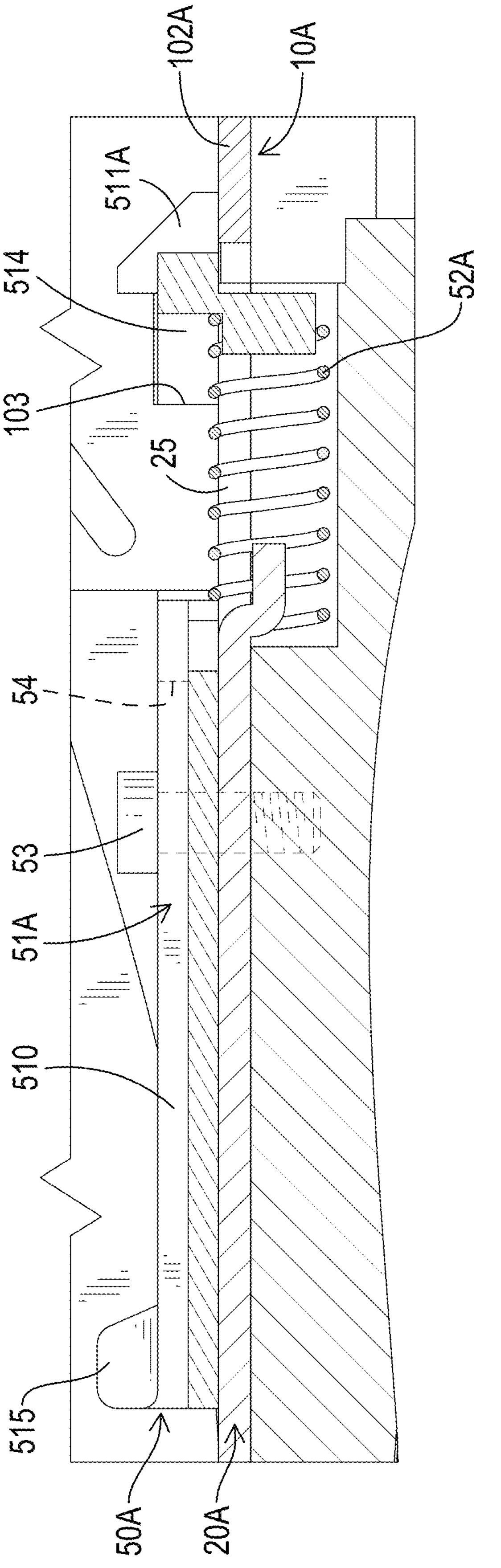
FIG. 10 is an enlarged side view of the stapler in FIG. 9.

With reference to FIGS. 9 and 10, a second preferred embodiment of the dual-mode stapler in accordance with the present invention differs from the first preferred embodiment in configurations between the fastening mechanism 50A and the first base 10A. In the second preferred embodiment, the operating unit 51A is disposed on a surface of the second base 20A, and the first base 10A has no engaging hook 11. When the operating unit 51A is at the locking position, the engaging portion 511A of the operating unit 51A is directly engaged with the connecting board 102A of the first base 10A.

With reference to FIGS. 9 and 10, the engaging portion 511A of the operating unit 51A is located between the two mount boards 101A to be engaged with the connecting board 102A. The second base 20A has at least one slide rail 24 formed on a top surface of the second base 20A along the sliding direction S. The operating unit 51A is mounted on said slide rail 24 and configured to slide between the locking position and the unlocking position along said slide rail 24. By said slide rail 24 limiting the operating unit 51A on the sliding direction S, the operating unit 51A can be disposed outside the second base 20A. A user may directly operate and observe the operating unit 51A outside the second base 20A.

Quantity of said slide rail 24 may be decided according to a size of the second base 20A, stability of sliding, or other needs, which is not limited to the second preferred embodiment. In other embodiments, said slide rail 24 may be formed on a side surface or a bottom surface of the second base 20A. Accordingly, the operating unit 51A can be disposed on said side surface or said bottom surface of the second base 20A or even surround and cover the second base 20A, which is not limited to the second preferred embodiment.

With reference to FIGS. 9 and 10, the operating unit 51A has a hollow structure. Specifically, the operating unit 51A has a main body 510 and two connecting arms 514. The main body 510 is spaced from the engaging portion 511A, and an end of each one of the two connecting arms 514 is connected to the main body 510. The first base 10 is located between the two connecting arms 514, and each one of the two mount boards 101A has a notch 103. Each one of the two connecting arms 514 is mounted through the notch 103 of a respective one of the two mount boards 101A to be connected to the engaging portion 511A.

Additionally, with reference to FIGS. 9 and 10, the elastic unit 52A is still a compression spring. Two opposite ends of the elastic unit 52A respectively abut against the engaging portion 511A and the second base 20A, and the second base 20A also has a containing recess 25 for the elastic unit 52A to be disposed therein. The operating unit 51A has at least one protrusion 515 protruding along a direction being non-parallel to the sliding direction S. When operating, a force along the sliding direction S can be applied on said protrusion 515 to push the operating unit 51A to slide, which is more convenient and more labor-saving in operation.

Preferably, the fastening mechanism 50A has at least one bolt 53, and the operating unit 51A has at least one elongated hole 54 defined therethrough. Said elongated hole 54 is parallel to said slide rail 24 and extends along the sliding direction S. Said bolt 53 is mounted through said elongated hole 54, screwed to and positioned on the second base 20A. When sliding along the sliding direction S, the operating unit 51A slides relative to said bolt 53 and the second base 20A via said elongated hole 54. By said bolt 53 and said elongated hole 54, a position-limiting effect can be provided for the operating unit 51A to stably slide along the sliding direction S in a specific range provided by said elongated hole 54.

Figure 11:
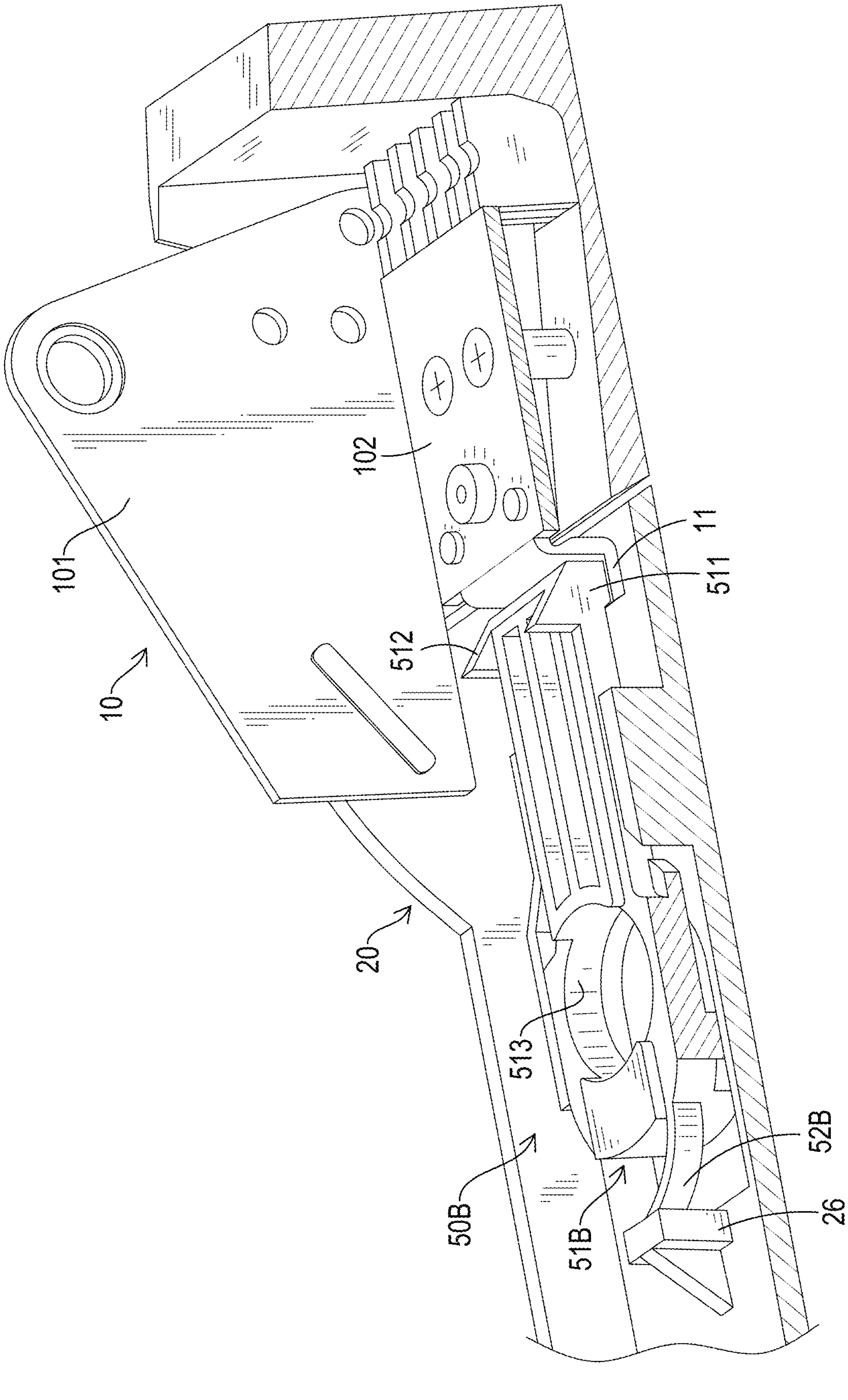
FIG. 11 is a cross-sectional perspective view of the first base, the second base, and the fastening mechanism of a third preferred embodiment of the dual-mode stapler in accordance with the present invention.

With reference to FIG. 11, a third preferred embodiment of the dual-mode stapler in accordance with the present invention differs from the first preferred embodiment in configuration of the elastic unit 52B. In the third preferred embodiment, the elastic unit 52B is formed in one-piece with the operating unit 51B and configured to be bent elastically relative to the operating unit 51B. An end of the elastic unit 52B away from the operating unit 51B abuts against a post 26 of the second base 20.

Specifically, the elastic unit 52B is a flat spring having a small thickness and configured to be bent relative to the operating unit 51B. When an external force drives the operating unit 51B to slide toward the unlocking position, the elastic unit 52B is compressed and bent between the post 26 and the operating unit 51B. When the operating unit 51B is released without any external force, the elastic unit 52B restores and drives the operating unit 51B to slide to the locking position. Thereby, the third preferred embodiment provides another type of the elastic unit 52B.

In addition to the compression spring and the flat spring being elastically deformable under compression, the elastic unit may be a tension spring, a torsion spring, or other elastic component according to structures and configurations of the first base 10, the second base 20, and the operating unit 51. As long as the elastic unit is configured to deform elastically to push the operating unit 51 toward the locking position, configuration of the elastic unit is not limited to the preferred embodiments.

Other than the three preferred embodiments described above, in some embodiments, the fastening mechanism 50 may be disposed on the first base 10, and the operating unit 51 is engaged with the second base 20 at the locking position and withdrawn from the second base 20 at the unlocking position. The stapler still prevents the problem of being unable to switch to the tacking mode and has versatileness. In the three preferred embodiments described above, since the operating unit 51, 51A, 51B is disposed on the second base 20, 20A being elongated, the second base 20, 20A can set a longitudinal direction thereof as the sliding direction S and forms a space for containing the operating unit 51, 51A, 51B and the elastic unit 52, 52A, 52B along the longitudinal direction. Configuration of the fastening mechanism 50,50A,50B is simpler in design and needs not occupy too much extra space.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A dual-mode stapler comprising:
two bases respectively being
a first base; and
a second base pivotally connected with the first base;
a magazine assembly pivotally connected with the first base and spaced from the second base;
a hammer assembly pivotally connected with the first base and spaced from the second base; and a fastening mechanism having an operating unit disposed on one of the two bases and configured to slide between a locking position and an unlocking position along a sliding direction; and an elastic unit disposed between the operating unit and the base on which the operating unit is disposed, and the elastic unit being elastically deformable to drive the operating unit toward the locking position;

wherein when the operating unit is at the locking position, the operating unit is engaged with the other one of the two bases;

when the operating unit is at the unlocking position, the operating unit is withdrawn from said the other one of the two bases so as to allow the second base to pivot relative to the first base away from the magazine assembly to an open state.

2. The dual-mode stapler as claimed in claim 1, wherein the first base has a first pivot position, a second pivot position, and a third pivot position arranged at spaced intervals;

the second base is pivotally connected to the first pivot position;

the hammer assembly has a hammer and an auxiliary hammer connected with each other;

the hammer and the magazine assembly are pivotally connected to the second pivot position; and the auxiliary hammer is pivotally connected to the third pivot position.

3. The dual-mode stapler as claimed in claim 2, wherein the second base has a base body and an upper cover; and the operating unit is disposed between the base body and the upper cover.

4. The dual-mode stapler as claimed in claim 3, wherein the base body of the second base has a communicating hole defined through the base body along a direction being non-parallel to the sliding direction and communicating with a space between the base body and the upper cover.

5. The dual-mode stapler as claimed in claim 4, wherein the operating unit has an operating hole formed thereon along a direction being non-parallel to the sliding direction and the operating hole is located within the scope of the communicating hole.

6. The dual-mode stapler as claimed in claim 2, wherein the second base has at least one slide rail formed on a surface thereof along the sliding direction;

the operating unit is mounted on the at least one slide rail and configured to slide between the locking position and the unlocking position along the at least one slide rail.

7. The dual-mode stapler as claimed in claim 6, wherein the operating unit has at least one elongated hole formed therethrough and being parallel to said slide rail;

the fastening mechanism has at least one bolt mounted through said elongated hole and positioned on the second base; and the operating unit slides relative to the second base and the at least one bolt via the at least one elongated hole.

8. The dual-mode stapler as claimed in claim 1, wherein the operating unit is disposed on the second base;

the elastic unit is disposed and has two opposite ends along the sliding direction; and the two opposite ends of the elastic unit respectively abut against the second base and the operating unit.

9. The dual-mode stapler as claimed in claim 1, wherein the operating unit is disposed on the second base;

the elastic unit is formed in one piece with the operating unit and configured to be bent elastically relative to the operating unit; and an end of the elastic unit abuts against the second base.

10. The dual-mode stapler as claimed in claim 1, wherein the operating unit has an inclined surface; and when the second base pivots toward the magazine assembly from the open state, the inclined surface of the operating unit disposed on one of the two bases is abutted and pushed by the other one of the two bases, such that the operating unit slides from the locking position toward the unlocking position and actuates the elastic unit to deform elastically.

11. The dual-mode stapler as claimed in claim 10, wherein the second base has a base body and an upper cover; and the operating unit is disposed between the base body and the upper cover.

12. The dual-mode stapler as claimed in claim 11, wherein the base body of the second base has a communicating hole defined through the base body along a direction being non-parallel to the sliding direction and communicating with a space between the base body and the upper cover.

13. The dual-mode stapler as claimed in claim 12, wherein the operating unit has an operating hole formed thereon along a direction being non-parallel to the sliding direction and the operating hole is located within the scope of the communicating hole.

14. The dual-mode stapler as claimed in claim 10, wherein the second base has at least one slide rail formed on a surface thereof along the sliding direction;

the operating unit is mounted on the at least one slide rail and configured to slide between the locking position and the unlocking position along the at least one slide rail.

15. The dual-mode stapler as claimed in claim 14, wherein the operating unit has at least one elongated hole formed therethrough and being parallel to said slide rail;

the fastening mechanism has at least one bolt mounted through said elongated hole and positioned on the second base; and the operating unit slides relative to the second base and the at least one bolt via the at least one elongated hole.

16. The dual-mode stapler as claimed in claim 1, wherein the second base has a base body and an upper cover; and the operating unit is disposed between the base body and the upper cover.

17. The dual-mode stapler as claimed in claim 16, wherein the base body of the second base has a communicating hole defined through the base body along a direction being non-parallel to the sliding direction and communicating with a space between the base body and the upper cover.

18. The dual-mode stapler as claimed in claim 17, wherein the operating unit has an operating hole formed thereon along a direction being non-parallel to the sliding direction and the operating hole is located within the scope of the communicating hole.

19. The dual-mode stapler as claimed in claim 1, wherein the second base has at least one slide rail formed on a surface thereof along the sliding direction;

the operating unit is mounted on the at least one slide rail and configured to slide between the locking position and the unlocking position along the at least one slide rail.

20. The dual-mode stapler as claimed in claim 19, wherein the operating unit has at least one elongated hole formed therethrough and being parallel to said slide rail;

the fastening mechanism has at least one bolt mounted through said elongated hole and positioned on the second base; and the operating unit slides relative to the second base and the at least one bolt via the at least one elongated hole.

* * * * *